(12) United States Patent
Frost et al.

(10) Patent No.: US 8,409,762 B2
(45) Date of Patent: Apr. 2, 2013

(54) ADAPTIVE METHOD TO CONTROL FUEL DELIVERY INJECTOR WITH MODELING UNCERTAINTIES IN A FUEL CELL SYSTEM

(75) Inventors: Patrick Frost, Tucson, AZ (US); Darrell W. Burleigh, Honeoye Falls, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/775,149

(22) Filed: May 6, 2010

(65) Prior Publication Data

US 2011/0274996 A1 Nov. 10, 2011

(51) Int. Cl.
*H01M 8/04* (2006.01)

(52) U.S. Cl. .......................... 429/444; 429/443

(58) Field of Classification Search .................. 429/443, 429/444
See application file for complete search history.

(56) References Cited

U.S. PATENT DOCUMENTS

2009/0081492 A1* 3/2009 Hasuka et al. .................. 429/13

* cited by examiner

*Primary Examiner* — Yogendra Gupta
*Assistant Examiner* — Alison Hindenlang
(74) *Attorney, Agent, or Firm* — John A. Miller; Miller IP Group, PLC

(57) ABSTRACT

A method for adaptively controlling a fuel delivery injector in a fuel cell system, including determining a feed-forward bias for the fuel delivery injector, determining an injector flow set-point for the fuel delivery injector, monitoring stack current, determining a transient pressure correction for the stack and correcting the injector flow set-point.

18 Claims, 2 Drawing Sheets

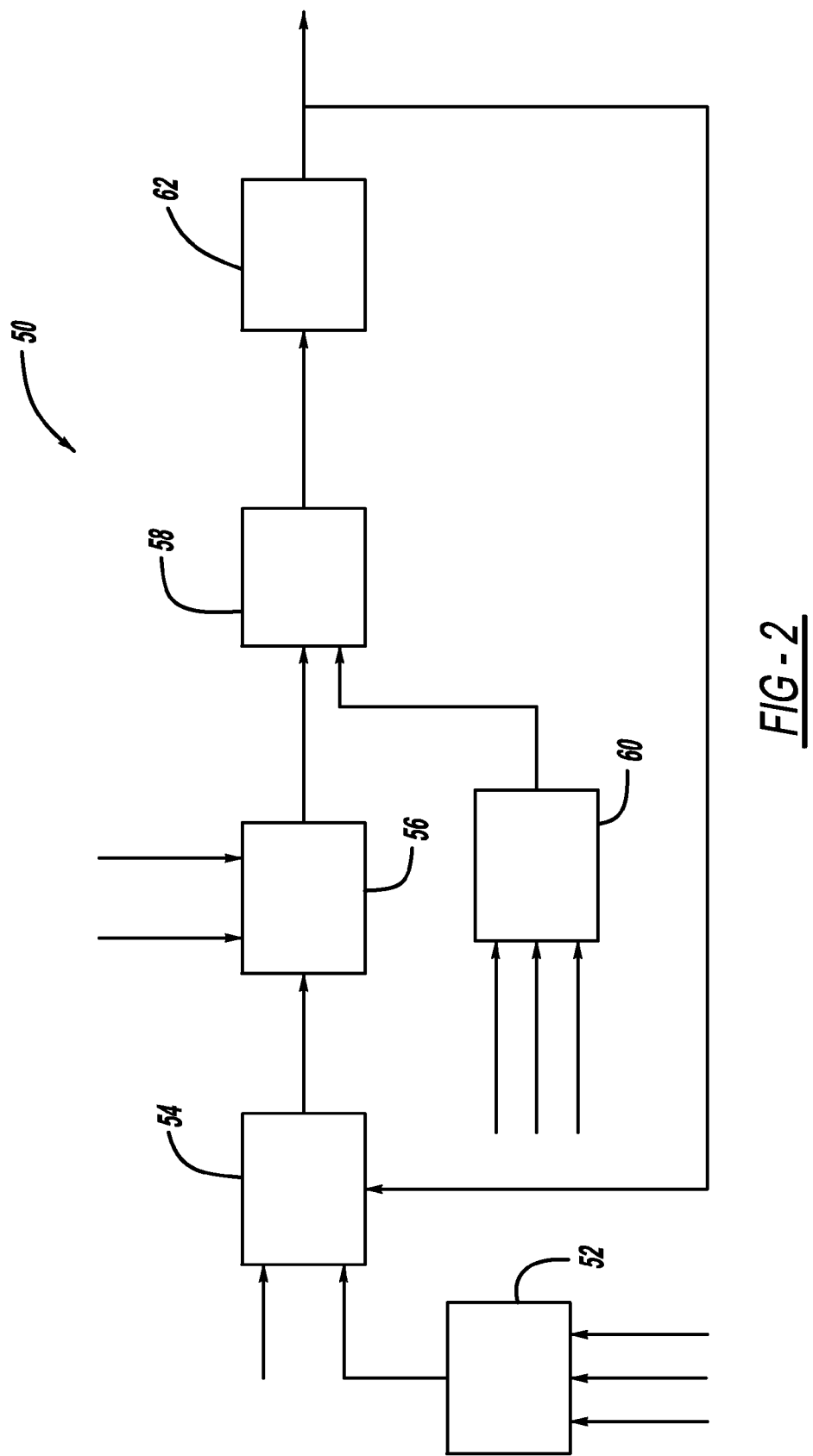

ADAPTIVE METHOD TO CONTROL FUEL DELIVERY INJECTOR WITH MODELING UNCERTAINTIES IN A FUEL CELL SYSTEM

BACKGROUND OF THE INVENTION

1. Field of the Invention

This invention relates generally to an adaptive method for controlling fuel delivery in a fuel cell system and, more particularly, to an adaptive method for controlling a fuel delivery injector that includes determining an error in an estimate of the fuel delivered compared to an estimate of the fuel consumed to more accurately determine a flow set-point for fuel in a fuel cell system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant humidity diffusion. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. The fuel cell stack also receives an anode hydrogen input gas that flows into the anode side of the stack. Not all of the oxygen is consumed by the stack and some of the air is output as a cathode exhaust gas that may include water as a by-product of the chemical reaction taking place in the stack.

The fuel cell stack includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Current fuel cell system software controls the injection of the anode hydrogen fuel by maintaining the pressure of the fuel cell stack using a controller with feed-forward control. The output of the controller operates to maintain the anode-side pressure of the fuel cell stack by utilizing a fuel flow set-point in moles per second. The estimated injector flow, which is based on the maintained pressure of the fuel cell stack, and which is described in more detail below, is used to estimate the concentration of nitrogen in the fuel cell stack, nitrogen bleed flow, stack anode differential pressure, anode stream water balance, and anode gas composition, as well as to detect leaks in the anode sub-system. A poorly tuned injector flow causes a large error in the nitrogen model used in the system, e.g., a 10% error in flow can cause a 20% error in the nitrogen model used. Therefore, accurately estimating injector flow is important in a fuel cell system.

As discussed above, the output of the pressure controller is used to determine the fuel flow set-point in moles per second. To set the injector's duty cycle, the maximum flow of the injector is calculated using a sonic orifice model with the injector characteristics determining a maximum flow coefficient ($k_v$), which is assumed to be at 100% duty cycle. The fuel flow set-point is then divided by the calculated maximum injector flow to determine the duty cycle.

Using the maximum fuel flow coefficient $k_v$ inherently assumes that the injector is completely linear and has no opening and closing flow effects. However, real injectors do not behave in this manner. Furthermore, as with any production part, injectors of the same design are not identical, and production parts do not wear the same. Thus, over the course of an injector's life, it can drift from its nominal specifications. All of these potential differences from a nominal injector can cause significant differences in the calculated injector flow. Further, injector flow is important because the current control software uses it to determine nitrogen bleed flow, stack anode differential pressure, anode stream water balance, and anode gas composition. Therefore, there is a need in the art for an adaptive injector model that is capable of capturing changes and differences in individual injectors.

SUMMARY OF THE INVENTION

In accordance with the teachings of the present invention, a method for adaptively controlling a fuel delivery injector that delivers hydrogen fuel to a fuel cell stack in a fuel cell system is disclosed. The method includes determining a feed-forward bias for the fuel delivery injector, determining an injector flow set-point for the fuel delivery injector, monitoring stack current, determining a transient pressure correction for the stack and correcting the injector flow set-point.

Additional features of the present invention will become apparent from the following description and appended claims, taken in conjunction with the accompanying drawings.

BRIEF DESCRIPTION OF THE DRAWINGS

FIG. 2 is a flow diagram of an adaptive method to control an injector in a fuel cell system.

DETAILED DESCRIPTION OF THE EMBODIMENTS

Figure 1:
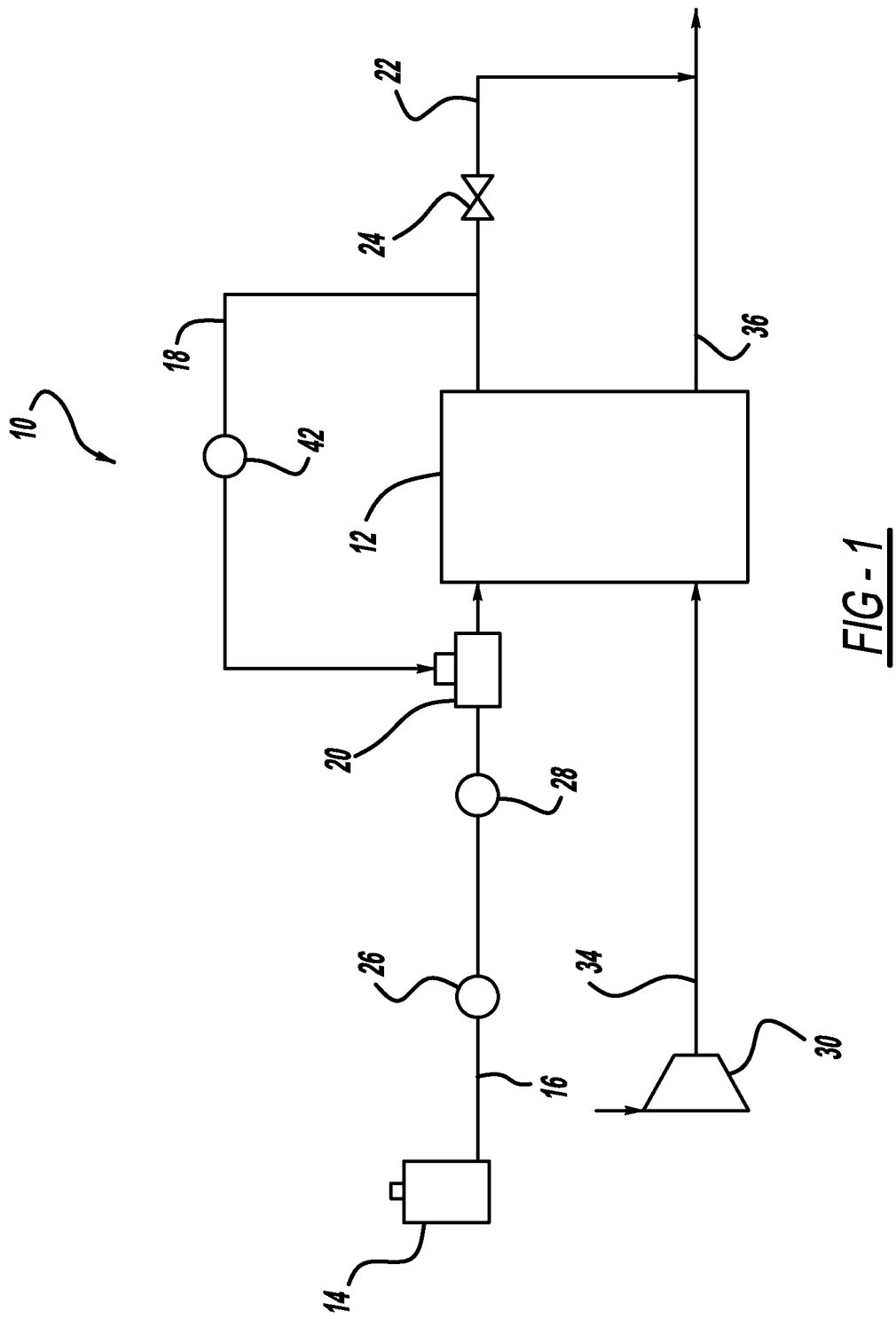
FIG. 1 is a schematic block diagram of a fuel cell system.

The following discussion of the embodiments of the invention directed to an adaptive method for controlling an injector that delivers hydrogen fuel to a fuel cell stack in a fuel cell system is merely exemplary in nature, and is in no way intended to limit the invention or its applications or uses.

FIG. 1 is a schematic block diagram of a fuel cell system 10 including a fuel cell stack 12 having an anode side and a cathode side. An injector 20 injects hydrogen into the anode side of the fuel cell stack 12 from a hydrogen source 14 on an anode input line 16. The injector 20 can be any injector, injector/ejector, or bank of injectors suitable for the purposes described herein. A temperature sensor 26 measures the temperature of the hydrogen in the anode input line 16, and a pressure sensor 28 measures the pressure of the hydrogen in the anode input line 16. In this embodiment, the fuel cell system 10 employs anode recirculation where an anode recirculation gas is output from the stack 12 and is recirculated back to the anode input line 16 by an anode recirculation line 18 through the injector 20. A pressure sensor 42 on the anode recirculation line 18 monitors the pressure in the anode side of the stack 12. A valve 24 is provided in an exhaust line 22 and is periodically opened to drain water and remove nitrogen from the anode side of the stack 12 based on a schedule, as is well understood to those skilled in the art. A compressor 30 provides an air flow to the cathode side of the fuel cell stack 12 on a cathode input line 34 and a cathode exhaust gas line 36 receives the cathode exhaust from the fuel cell stack 12.

As discussed above, there is a need in the art for an adaptive injector model that is capable of capturing changes and differences in individual injectors in order to alleviate the inadequacies of previous methods for fuel delivery. FIG. 2 is a flow diagram 50 illustrating an embodiment of an adaptive injector control algorithm that is capable of adapting to the characteristics of individual injectors. The algorithm is utilized at times when the anode side is operating as a closed system, i.e., when all valves, such as the valve 24, are closed, when the fuel cell system 10 is operating in a steady-state where the injector 20 is adding only as much fuel as is being consumed to maintain the desired pressure.

A feed-forward bias calculation is determined at box 52 based on three inputs: (1) current, which correlates to hydrogen consumption, (2) valve losses, which is a determination of pressure loss based on whether there are any valves open in the anode sub-system of the system 10, and (3) a transient correction, which is a pressure correction based on transients in the pressure of the fuel cell stack 12, as measured by the pressure sensor 42. From these three inputs a flow bias is determined, which is an estimated desired flow of hydrogen to maintain the fuel cell stack 12 at a desired pressure. The algorithm determines what the flow set-point of the injector 20 should be at box 54 based on a predetermined pressure set-point, pressure feedback of the fuel cell system 10, and the flow bias calculated at the box 52.

The flow set-point is then corrected by an adaptive corrector at box 56 by comparing the flow set-point to stack current, which correlates to the hydrogen consumption, and the transient pressure correction, which is the pressure correction based on transients in the pressure of the fuel cell stack 12, as measured by the pressure sensor 42. The flow set-point is adjusted to match the hydrogen consumption and the transient pressure correction when all of the anode valves are closed. The corrected flow set-point from the box 56 is then used to determine the desired duty cycle of the injector 20 at box 58. The desired duty cycle of the injector 20 is determined based on the corrected flow set-point from the box 56 and a maximum fuel flow calculation from box 60. The maximum flow calculation is the maximum flow the injector 20 is capable of, and is based on the pressure of the hydrogen supply from the source 14, as measured by the pressure sensor 28, the temperature of the hydrogen supply, as measured by the temperature sensor 26, and the maximum flow coefficient $k_v$, which is based on the size of the orifice of the injector 20. Once the desired duty cycle of the injector 20 is determined, the injector duty cycle is utilized by the fuel cell system at box 62. A pressure feedback from the fuel cell system 10, as measured by the pressure sensor 42, while operating with the desired duty cycle of the injector 20 at the box 62, is used as an input in determining the flow set-point at the box 54, as described above.

Thus, the adaptive injector control algorithm takes the output of the pressure controller, i.e., the fuel flow set-point, and compares it to the stack current and the stack pressure transients, as described above, when certain conditions are met. An error e between the fuel flow set-point and the current and pressure transients is used to create a scaling factor $\dot{\eta}_{INJ,ADP}^{SP}$, described in more detail below, of the flow set-point that is then passed on to the duty cycle calculator to ensure that inaccuracies in the injector model are not propagated to the flow set-point when the system is sealed. Thus, the estimation of the injector flow is refined, thereby allowing greater accuracy in other system estimations, such as the nitrogen concentration estimation, as well as leak detection.

The scaling factor $\dot{\eta}_{INJ,ADP}^{SP}$ determined by the algorithm at the box 56 is defined as follows:

$$\dot{\eta}_{INJ,ADP}^{SP} = \dot{\eta}_{INJ}^{SP} \cdot (1 + k_p e + k_i \int_0^y e \, dt + k_a \int_0^t [k_i \int_0^u e \, du] dt) \quad (1)$$

Where:

$$e = \dot{n}_{INJ}^{SP} - \frac{INcell}{2F} - \frac{\dot{P}V}{RT} \quad (2)$$

And where $\dot{\eta}_{INJ,ADP}^{SP}$ is the scaling factor, $\dot{\eta}_{INJ}^{SP}$ is the injector flow set-point assuming a linear flow injector response, $k_p$ is the proportional gain, $k_i \int_0^y e \, dt$ is a first integral gain, $k_a \int_0^t [k_i \int_0^u e \, du] dt$ is a second integral gain, I is the stack current, Ncell is the number of cells in the stack 12, P is the anode pressure, V is the anode volume, T is the temperature of the anode gas, F is Faradays constant, and R is the universal gas constant.

Equation (1) is essentially a PI optimization with a second, long-term integrator. The proportional p gain attempts to correct for instantaneous error, the first integral i gain corrects for steady-state error in the short term, and the second integrator a gain captures long-term error, i.e., those errors that indicate a permanent error, such as part-to-part variations of the injector 20. In the algorithm, each step of the a gain, the long-term error, is removed from the i gain, the short term error, in order to stabilize the long-term error and keep the algorithm from over-adapting. As discussed above, the algorithm is stalled when an anode valve is opened. Furthermore, the algorithm is valid only during the run mode and hydrogen crossover is assumed to be minimal or zero. Thus, anode pressure flow set-point is indicative of what is being injected into the system. An adaption threshold may also be utilized at the box 56 to trigger a diagnostic tool once the adaption threshold is achieved to enable the algorithm to detect and mitigate system leaks.

As discussed above, prior duty cycle algorithms assume a linear injector response, which is an assumption that does not adequately represent real world operation. According to the present invention, as described above, if the adaption by the algorithm at the box 56 is unique at different points of the flow curve, the algorithm can be used effectively by storing the status of the a gain in bins divided by current density, because current density is directly proportional to flow. Thus, when the fuel cell system 10 moves up and down the flow curve, which is expected due to the non-linearity of the flow through the injector 20, the adaptive algorithm resets itself to use the correct value from the corresponding bin and continues adapating. As is known to those skilled in the art, bins are data structures that allow for efficient region queries by partitioning regions of a two dimensional plane, thereby allowing the algorithm to adapt for non-linearities.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for adaptively controlling a fuel delivery injector that delivers hydrogen fuel to a fuel cell stack in a fuel cell system, said method comprising:
   determining a feed-forward flow bias for the fuel delivery injector by monitoring stack current and determining valve losses and a transient pressure correction in the fuel cell stack;
   determining a flow set-point for the injector;
   correcting the flow set-point of the injector to determine a corrected flow set-point;
   determining a maximum flow rate for the injector;
   determining a duty cycle of the injector based on the corrected flow set-point and the maximum flow rate; and
   using the duty cycle to control the injector to inject fuel into the fuel cell stack.

2. The method according to claim 1 further comprising storing an injector flow scaling factor in bins.

3. The method according to claim 1 wherein determining the flow set-point of the injector includes comparing the feed-forward flow bias with a pressure set-point and pressure feedback from the fuel cell stack.

4. The method according to claim 1 wherein correcting the flow set-point of the injector to determine a corrected flow set-point includes determining the hydrogen consumption of the fuel cell stack and pressure transients of the fuel cell stack.

5. The method according to claim 1 wherein determining a maximum flow rate for the injector includes determining the maximum flow coefficient for the injector, the pressure of the hydrogen supply, and the temperature of the hydrogen supply.

6. The method according to claim 1 further comprising creating a scaling factor of the flow set-point that is passed on to the duty cycle determination to ensure that inaccuracies in the injector model are not propagated to the flow set-point when the system is sealed.

7. The method according to claim 6 wherein correcting the injector flow set-point includes providing a scaling factor by:

$$\dot{n}_{INJ\_ADP}^{SP}=\dot{n}_{INJ}^{SP}\cdot(1+k_p e+k_i\int_0^y e\,dt+k_a\int_0^t [k_j\int_0^u e\,du]dt) \quad (1)$$

where:

$$e = \dot{n}_{INJ}^{SP} - \frac{INcell}{2F} - \frac{\dot{P}V}{RT}$$

and where $\dot{n}_{INJ\_ADP}^{SP}$ is, the scaling factor, $\dot{n}_{INJ}^{SP}$ is the injector flow set-point assuming a linear injector response, $k_p$ is a proportional gain, $k_i\int_0^y e\,dt$ is a first integral gain, $k_a\int_0^t [k_j\int_0^u e\,du]dt$ is a second integral gain, I is the stack current, Ncell is the number of cells in the stack, P is the anode pressure, Lt is the anode volume, T is the temperature of the anode gas, F is Faradays constant, and R is the universal gas constant.

8. The method according to claim 7 wherein $k_i\int_0^y e\,dt$ is a short-term error.

9. The method according to claim 7 wherein $k_a\int_0^t [k_j\int_0^u e\,du]dt$ is a long-term error.

10. A method for adaptively controlling a fuel delivery injector that delivers hydrogen fuel to a fuel cell stack in a fuel cell system, said method comprising:
    determining a feed-forward flow bias for the fuel delivery injector by monitoring stack current and determining valve losses and a transient pressure correction in the fuel cell stack;
    determining an injector flow set-point for the fuel delivery injector;
    monitoring stack current in the fuel cell system;
    determining a transient pressure correction for the fuel cell stack; and
    correcting the injector flow set-point.

11. The method according to claim 10 further comprising storing an injector flow scaling factor in bins.

12. The method according to claim 10 wherein determining the injector flow set-point includes comparing the feed-forward flow bias with a pressure set-point and pressure feedback from the fuel cell stack.

13. The method according to claim 10 wherein correcting the flow set-point includes determining hydrogen consumption and pressure transients of the fuel cell stack.

14. The method according to claim 10 further comprising creating a scaling factor of the flow set-point to ensure that inaccuracies in the injector model are not propagated to the flow set-point when the system is sealed.

15. The method according to claim 14 wherein correcting the injector flow set-point includes providing a scaling factor by:

$$\dot{n}_{INJ\_ADP}^{SP}=\dot{n}_{INJ}^{SP}\cdot(1+k_p e+k_i\int_0^y e\,dt+k_a\int_0^t [k_j\int_0^u e\,du]dt) \quad (1)$$

where:

$$e = \dot{n}_{INJ}^{SP} - \frac{INcell}{2F} - \frac{\dot{P}V}{RT}$$

and where $\dot{n}_{INJ\_ADP}^{SP}$ is the scaling factor, $\dot{n}_{INJ}^{SP}$ is the injector flow set-point assuming a linear injector response, $k_p$ is a proportional gain, $k_i\int_0^y e\,dt$ is a first integral gain, $k_a\int_0^t [k_j\int_0^u e\,du]dt$ is a second integral gain, I is the stack current, Ncell is the number of cells in the stack, P is the anode pressure, V is the anode volume, T is the temperature of the anode gas, F is Faradays constant, and R is the universal gas constant.

16. The method according to claim 15 wherein $k_i\int_0^y e\,dt$ is a short-term error.

17. The method according to claim 15 wherein $k_a\int_0^t [k_j\int_0^u e\,du]dt$ is a long-term error.

18. A method for adaptively controlling a fuel delivery injector that delivers hydrogen fuel to a fuel cell stack of a fuel cell system in a vehicle, said method comprising:
    determining a feed-forward flow bias by monitoring current of a fuel cell stack, and determining valve losses and a transient pressure correction in the fuel cell stack;
    determining a flow set-point of the fuel delivery injector by comparing the feed-forward flow bias with a pressure set-point and pressure feedback from the fuel cell stack;
    correcting the flow set-point of the fuel delivery injector to determine a corrected flow set-point by comparing the determined injector flow set-point to the hydrogen consumption of the fuel cell stack and the transient pressure correction of the stack, wherein the flow set-point is adjusted to match the hydrogen consumption and the transient pressure correction of the stack when all of the anode valves are closed;

storing a scaling factor of the flow set-point in bins;

creating a corrected injector flow that is passed on to an injector duty cycle determination;

determining a maximum flow rate for the injector using the maximum flow coefficient for the injector, the pressure of the hydrogen supply, and the temperature of the hydrogen supply;

determining the duty cycle of the fuel delivery injector based on the corrected flow set-point and the maximum flow rate for the injector; and using the duty cycle to control the injector to inject fuel into the fuel cell stack.

* * * * *